United States Patent [19]

Tremblay

[11] Patent Number: 5,781,318
[45] Date of Patent: Jul. 14, 1998

[54] CIRCUIT AND METHOD OF TESTING FOR SILENT FAULTS IN A BI-DIRECTIONAL OPTICAL COMMUNICATION SYSTEM

[75] Inventor: Yves Tremblay, Nepean, Canada

[73] Assignee: Fitel Photomatrix, Nepean, Canada

[21] Appl. No.: 691,538

[22] Filed: Aug. 2, 1996

[51] Int. Cl.[6] .................................................. H04B 10/12
[52] U.S. Cl. ............................. 359/113; 359/110; 359/153
[58] Field of Search .................................. 359/110, 152, 359/153, 113, 114, 161

[56] References Cited

U.S. PATENT DOCUMENTS

| | | | |
|---|---|---|---|
| 4,399,563 | 8/1983 | Greenberg | 359/113 |
| 4,825,113 | 4/1989 | Sato et al. | 359/110 |
| 4,994,675 | 2/1991 | Levin et al. | 359/110 |
| 5,510,917 | 4/1996 | Corke et al. | 359/110 |
| 5,539,564 | 7/1996 | Kumozaki et al. | 359/161 |

FOREIGN PATENT DOCUMENTS

| | | | |
|---|---|---|---|
| 247641 | 10/1987 | Japan | 359/113 |
| 127829 | 5/1990 | Japan | 359/110 |
| 2195508 | 4/1988 | United Kingdom | 359/110 |

*Primary Examiner*—Leslie Pascal
*Attorney, Agent, or Firm*—Neil Teitelbaum & Associates

[57] ABSTRACT

In optical communications systems crosstalk can result in what is termed silent failure. In silent failure, a faulty transmitter appears to function correctly because a receiver in communication therewith is receiving a signal induced by crosstalk. The invention overcomes this problem by tapping the received signal and monitoring it external to the receiver in order to ensure adequate signal levels for a received signal. A microcontroller disables the failed circuit and in an embodiment switches the communication functions to a stand-by circuit.

20 Claims, 4 Drawing Sheets

CIRCUIT AND METHOD OF TESTING FOR SILENT FAULTS IN A BI-DIRECTIONAL OPTICAL COMMUNICATION SYSTEM

FIELD OF THE INVENTION

The present invention relates to optical systems, and more particularly to a method circuitry for detecting failure in an optical transmission path, and, for subsequently restoring service after verification that a previously failed transmission path is correctly functioning.

BACKGROUND OF THE INVENTION

Systems are known that monitor transmission lines for faulty communication between a transmitting terminus and a receiving terminus. One such system described in U.S. Pat. No. 5,396,569 issued Mar. 7, 1995 is assigned to FURUKAWA ELECTRIC CO., LTD. of Japan. An optical line monitoring method and an apparatus for locating a failure point in an optical communication system is described. Another such system available from FITEL-PHOTOMATRIX of Canada and provides a means of monitoring a bi-directional transmission path having transponders at either end, for silent failure; means are provided that ensure a faulty transmission path is taken out of service and control is passed to a redundant "hot-standby" transmission path having similar transponders at either end. This system will be described in more detail with reference to the prior art drawings.

It is an object of the invention to provide circuitry that will allow a "hot-standby" communications module to be tested in situ.

It is a further object of the invention to provide circuitry that will allow in situ testing and verification of communications modules prior to being used for communications purposes.

SUMMARY OF THE INVENTION

Advantageously the invention provides a means of determining whether a bi-directional communications link is properly working before returning it to service. Furthermore, the invention provides a means of testing and ensuring that a redundant "hot-standby" circuit is properly functioning by testing it in accordance with the principles of this invention from time to time.

In accordance with the invention there is provided, an optical communications system comprising a bi-directional communications path having first and second terminus ends, said first and second terminus ends being coupled to first transmission and receiving paths and second transmission and receiving paths respectively;

first transmission means for transmitting first optical signals from the first transmission path via the first terminus end to the second receiving path via the second terminus end;

second transmission means for transmitting second optical signals from the second transmission path via the second terminus end to the first receiving path via the first terminus end;

first receiving means at the first receiving path for receiving optical signals transmitted from the second transmission means;

second receiving means at the second receiving path for receiving optical signals transmitted from the first transmission means; and, means for monitoring a characteristic of at least one of the transmission and receiving paths;

and means coupled to at least one of the first and second transmission paths for interrupting transmission along at least one of said paths, in dependence upon the monitored characteristic.

In accordance with the invention there is further provided, an optical communications system comprising:

primary and secondary communications modules, the secondary communications module being a standby module, communications being switchable between the primary and secondary modules and vice versa in dependence upon a predetermined event, said primary and secondary modules each including:

a bi-directional communications path having first and second terminus ends, said first and second terminus ends being coupled to first transmission and receiving paths and second transmission and receiving paths respectively;

first transmission means for transmitting first optical signals from the first transmission path via the first terminus end to the second receiving path via the second terminus end;

second transmission means for transmitting second optical signals from the second transmission path via the second terminus end to the first receiving path via the first terminus end;

first receiving means at the first receiving path for receiving optical signals transmitted from the second transmission means;

second receiving means at the second receiving path for receiving optical signals transmitted from the first transmission means; and means for monitoring a characteristic of at least one of the transmission and receiving paths;

and means coupled to at least one of the first and second transmission paths for interrupting transmission along at least one of said paths, in dependence upon the monitored characteristic.

In accordance with another aspect of the invention there is provided, an optical communications module comprising a bi-directional port for connection to a bi-directional communications path; a transmission and a receiving path coupled to the bi-directional port, the transmission path for connection to an optical transmitter, and the receiving path for connection to an optical receiver;

means coupled to the transmission path for selectably, substantially interrupting an optical signal from being transmitted along the transmission path to the bi-directional port; and, means coupled to one of the transmission and receiving paths for monitoring an optical signal level thereon, and for providing control for selectably interrupting the optical signal.

In accordance with yet another aspect of the invention, in an optical communications system having primary and secondary modules, each module including a bi-directional communications path having first and second terminus ends, said first and second terminus ends being coupled to first transmission and receiving paths and second transmission and receiving paths respectively;

first transmission means for transmitting first optical signals from the first transmission path via the first terminus end to the second receiving path via the second terminus end;

second transmission means for transmitting second optical signals from the second transmission path via the second terminus end to the first receiving path via the first terminus end;

first receiving means at the first receiving path for receiving optical signals transmitted from the second transmission means;

second receiving means at the second receiving path for receiving optical signals transmitted from the first transmission means; and means for monitoring a characteristic of at least one of the transmission and receiving paths;

and means coupled to at least one of the first and second transmission paths for interrupting transmission along at least one of said paths, in dependence upon the monitored characteristic.

BRIEF DESCRIPTION OF THE DRAWINGS

Exemplary embodiments of the invention will now be described in conjunction with the drawings, in which.

DETAILED DESCRIPTION

Figure 1:
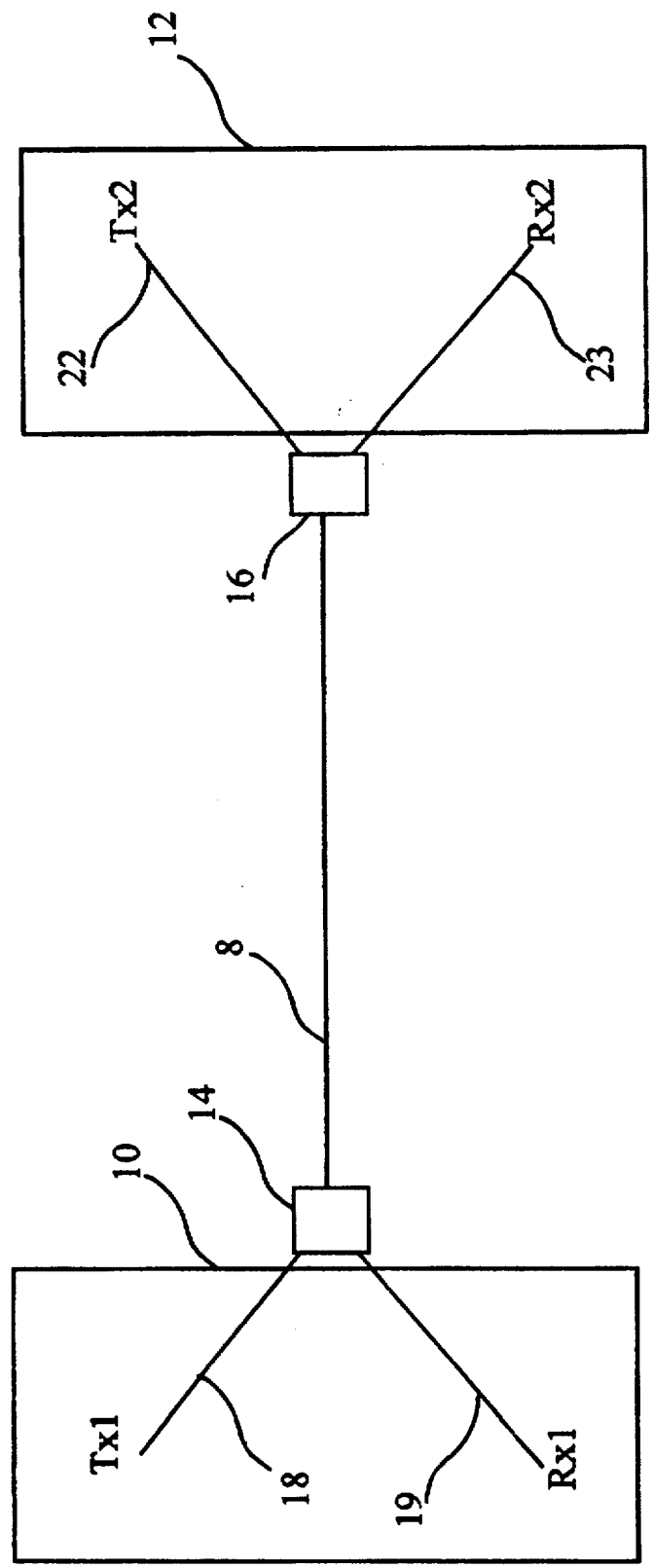
FIG. 1 is an illustration of a topology of a prior art bi-directional communications system having transponders at either end.

Referring now to FIG. 1, a transmission topology is shown wherein a first transponder block 10 is coupled to a second transponder block 12 via a bi-directional optical fiber path 8. Optical couplers 14 and 16 in the form of optical splitters disposed at a first and a second terminus respectively optically couple first and second transponders 10 and 12 via optical fiber path 8. First transponder block 10 includes first transmission and receiving paths 18 and 19 respectively; block 10 also includes a first transmitter and a first receiver labeled Tx1 and Rx1 coupled to first transmission and receiving paths 18 and 19. A second transponder block 12 includes second transmission and receiving paths 22 and 23 respectively; and similarly, a second transmitter and second receiver labeled Tx2 and Rx2 coupled to the second transmission and receiving paths 22 and 23. Within the figures, same reference numerals are used for same elements and/or components. The operation of the optical configuration shown will now be described. Conveniently, the transmission paths described hereafter take the form of optical fibers. The first transmitter labeled Tx1 transmits a digital optical signal in the form of optical pulses along transmission path 18. The optical pulses then propagate along the bi-directional optical fiber path 8. A large portion of the signal energy is diverted by the splitter 16 to optical receiving path 23, to be received by the receiver Rx2. Conversely, an optical signal transmitted from the second transmitter Tx2 follows the path defined by optical fibers 22, 8 and 19 until it is received by the receiver Rx1.

Figure 2:
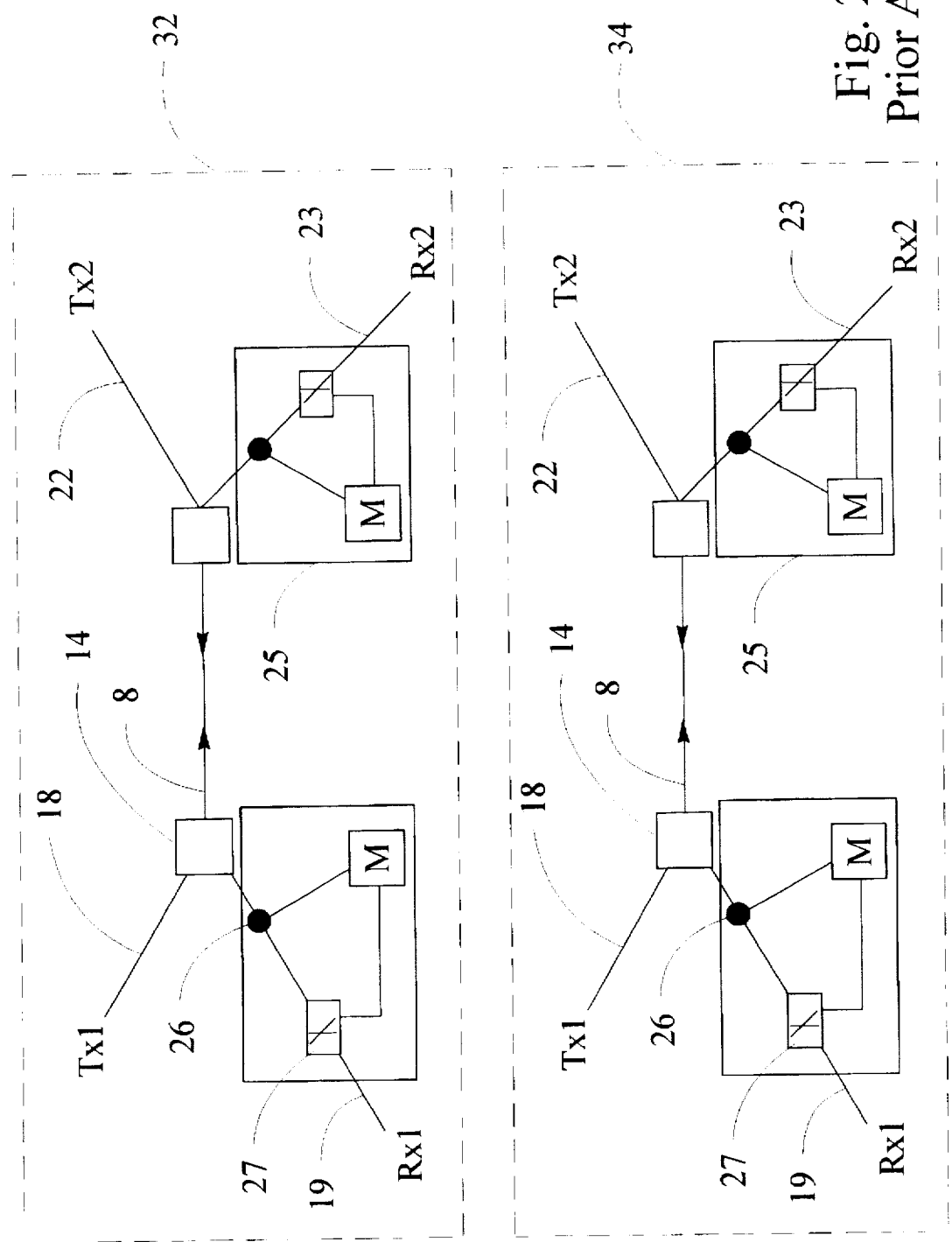
FIG. 2 is an illustration in accordance with the prior art including a redundant "hot-standby" bi-directional communications system and including monitoring and switching means disposed along each receiving path.

Referring now to prior art FIG. 2, a same transmission topology (duplicated) is shown and includes additional monitoring and disabling circuitry 25 disposed on each of paths 19 and 23. Included in FIG. 2 is a first communications circuit 32 and a second redundant "hot-standby" communications circuit 34. Circuit 34 is provided allowing communications may be switched thereto in the event of a detected failure of the primary circuit 32.

Under normal operation, transmitter Tx1 of communications circuit 32 transmits a communications signal to receiver Rx2; and, transmitter Tx2 of circuit 32 transmits a communications signal to receiver Rx1. Unfortunately, and often, unwanted crosstalk occurs between transmitter Tx1 and its receiver Rx1; thus, Rx1 typically receives a low level signal from its own transmitter Tx1. Under normal circumstances, this unwanted low level crosstalk signal appearing at the input of receiver Rx1 is ignored, however, in the event of transmitter Tx2 failing, it is preferred that Rx1 does not become locked to Tx1's low level unwanted crosstalk signal present on the input port of Rx1 in the absence of Tx2's signal. In an attempt to overcome and avoid this event termed "silent failure", that may not otherwise be detected, the monitoring and disabling circuitry 25 is provided. The circuitry 25 includes a tap coupler 26 for providing a tap signal from the path 19 to a detector microcontroller circuit labeled M. An optical switch 27 is provided for substantially preventing the receiver Rx1 from receiving a signal when it is determined by the detector microcontroller circuitry M, that the detected signal level on path 19 is below a predetermined threshold. In the instance that the receiver Rx1 is substantially prevented from receiving a signal, Rx1 is taken out of service and the redundant "hot-standby" 34 becomes the primary active circuit. Thus, the circuitry 25 prevents the receiver from locking to its own transmitter Tx1, in the event of the other transmitter Tx2 failing. The prior art circuitry 25 described heretofore conveniently obviates the past problem of silent failure. However, it has been found that there remains a problem that is not addressed by the scheme shown in FIG. 2.

After a detected faulty circuit is taken out of service, it is advantageous and usually essential to know of the circuit at some later time is working or, to ensure that its replacement circuit has no faults. It is therefore desired to test a repaired or replacement unit in situ; further, it is desired to have the capability of testing a circuit in "hot-standby" mode. Although the circuit of FIG. 2 adequately performs its intended function, the topology does not adequately lend itself to such in situ testing. For example, switching on a previously faulty circuit 32, may produce a false sense of security; in some instances a receiver Rx1 may be receiving and locking to a signal from its own transmitter Tx1 and not from transmitter Tx2 as would be expected if Tx2 were properly functioning.

Figure 3:
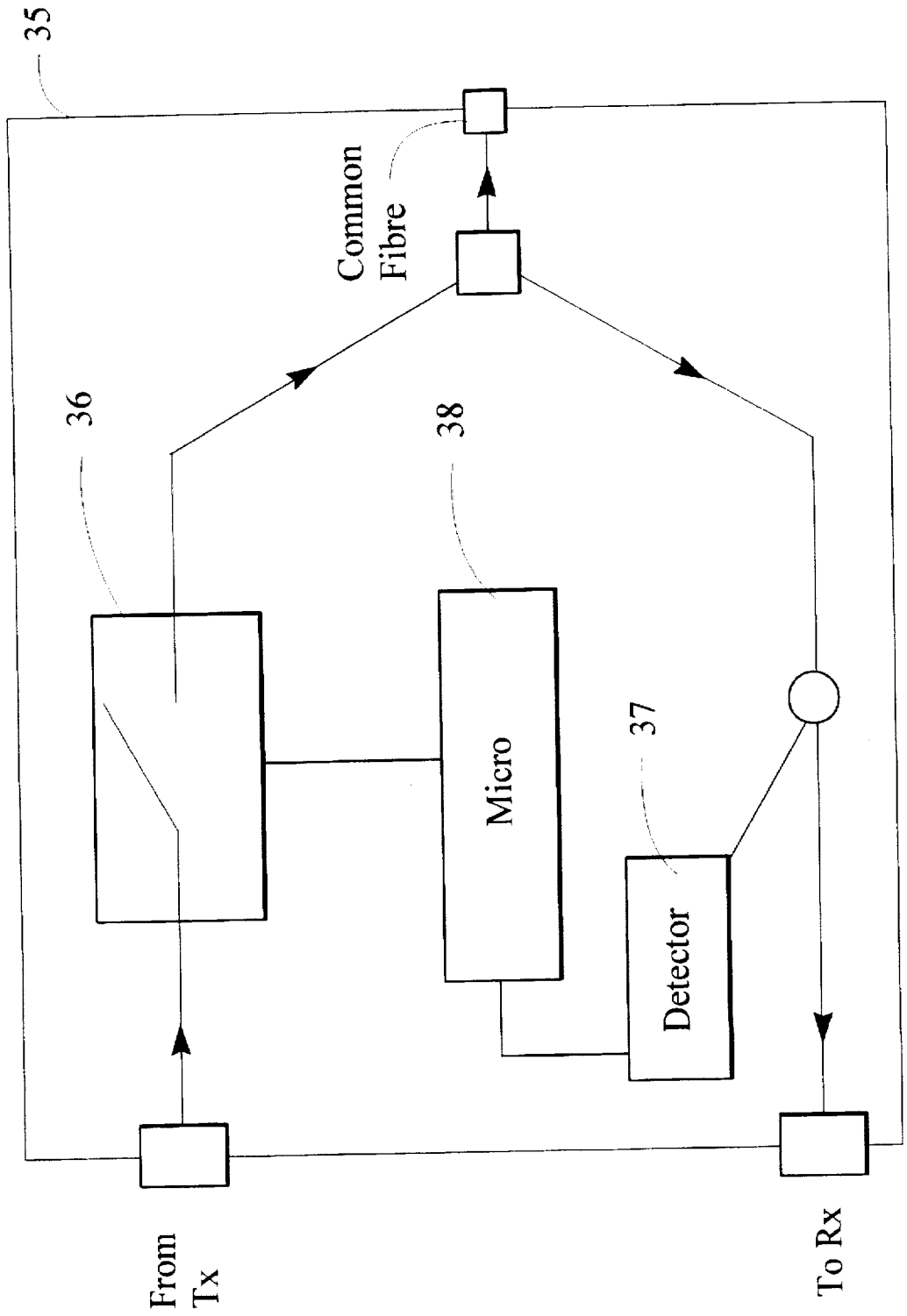
FIG. 3 is a detailed block circuit diagram of the monitoring and switching means shown in prior art FIGS. 1 to 2; and, FIG. 4 is an illustration in the form of a block circuit diagram in accordance with this invention of communications system having control means for returning a verified operating circuit to service.
Figure 4:
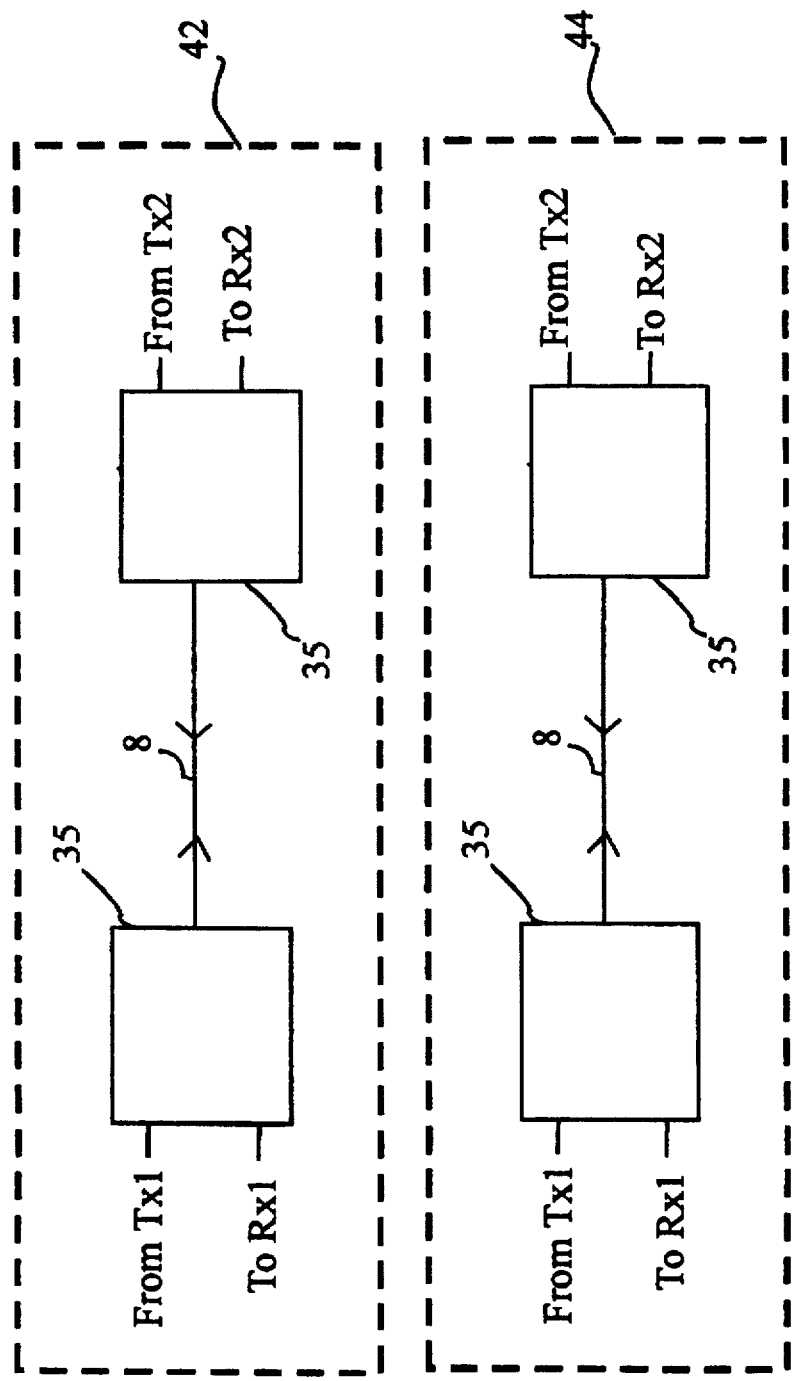

Turning now to FIGS. 3 and 4 a circuit topology is shown whereby means are provided along the transmission paths 18 and 22 for substantially preventing optical signals from being transmitted along those paths in the event of a detected failure. The module 35 comprises a common bi-directional fiber terminal for connection to optical fiber 8; an optical switch 36 that may be in the form of a selectable attenuator is further provided, and upon selection, the switch essentially extinguishes (by absorbing or reflecting) an optical signal propagating along the path from the transmitter Tx1. The module 35 further comprises an optical detector 37 optically coupled to one of the transmitting and receiving paths, (shown in FIG. 3 as coupled to the receiving path), and a microprocessor/controller 38 and necessary circuitry for determining when a detected signal is below a predetermined minimum intensity threshold and for enabling the selectable switch 36 in that instance. Of course means for interrupting transmission may interrupt when a tapped signal is above or below a predetermined threshold. In the preferred embodiment the optical switch yields an insertion loss of greater than 30 dB, essentially causing its own receiver Rx1 to lose data reception from its transmitter. By having the capability of effectively switching off a receiver's (Rx1) transmitter, a determination can be made as to whether the sending transmitter Tx2 at the other end of the bi-directional common fiber 8, is functioning.

When the system shown in FIG. 4 is first switched on, coordinated testing is initiated by the Tx1 and Tx2 ends; measurements are recorded of signal levels in the absence of crosstalk, by isolating circuit paths using the respective modules 35. Furthermore, measurements are recorded of crosstalk signal levels, by switching off respective far end transmitters, wherein the circuit is forced into a loop-back mode temporarily. This process is continued until it is established that "real" signals are of a significantly greater magnitude than crosstalk signals. Means are provided, (coupled to one of the transmission and receiving paths) for effecting resumption of transmission of the optical signal after it has been interrupted, these means being operative in dependence upon predetermined operating conditions being satisfied. In the event that a fault causes triggering of the system, the testing sequence is resumed.

One exemplary triggering and switching to "hot-standby" sequence is as follows:

1.) A power change that is below the threshold is detected by 37, 38 on side 1.
2.) Tx1 is blocked by 38, 36
3.) Any crosstalk signal to Rx1 is essentially extinguished and drops to a very low level
4.) detector controller 37, 38 on side 2 detects a loss in the "real" signal from Tx1 side 1 and Rx2 only receives crosstalk from its transmitter Tx2 in the absence of Tx1's signal.
5.) 38, 36 on side 2 blocks Tx2 due to the change in signal level detected
6.) Rx2 now receives no signal and the transmission system switches traffic from side 1 to side 2 onto the redundant "hot-standby" 44
7.) Rx1 now receives no signal and the transmission system switches traffic from side 2 to side 1 to the redundant "hot-standby" 44.

Under normal operating conditions, the "real" signal from one transmitter to its receiver at the other end of the link 8, must meet a required level for the receiver to operate properly; and, the signal level must exceed the local crosstalk signal by 10 to 15 dB in order to avoid interference errors between real and crosstalk signals.

Of course, numerous other embodiments may be envisaged, without departing from the spirit and scope of the invention.

I claim:

1. An optical communications system comprising:
   a bi-directional communications path having first and second terminus ends, said first and second terminus ends being coupled to first transmission and receiving paths and second transmission and receiving paths respectively;
   first transmission means for transmitting first optical signals from the first transmission path via the first terminus end to the second receiving path via the second terminus end;
   second transmission means for transmitting second optical signals from the second transmission path via the second terminus end to the first receiving path via the first terminus end;
   first receiving means at the first receiving path for receiving optical signals transmitted from the second transmission means;
   second receiving means at the second receiving path for receiving optical signals transmitted from the first transmission means; and,
   means separate from the first and second transmission means and first and second receiving means for monitoring a characteristic of at least one of the transmission and receiving paths;
   and means exclusive of said first and second transmission means coupled to at least one of the first and second transmission paths for interrupting transmission along at least one of said paths, in dependence upon the monitored characteristic.

2. An optical communications system as defined in claim 1, wherein the means for interrupting transmission is along at least one of the first and second transmission paths and is disposed between one of said terminus ends and its respective transmission means for interrupting transmission along at least one of said paths.

3. An optical communications system as defined in claim 2, comprising means for monitoring optical power intensity, said means including a tap disposed along at least one of said first and second transmission and receiving paths, for tapping light.

4. An optical communications system as defined in claim 1, wherein characteristic is optical power intensity.

5. An optical communications system as defined in claim 1, further comprising second monitoring means for monitoring optical power intensity along at least one of said second transmission and receiving paths, said monitoring means comprising a tap disposed along one of said second transmission and receiving paths for tapping light.

6. An optical communications system as defined in claim 1, wherein means for monitoring a characteristic of at least one of the transmission and receiving paths comprises a tap coupler for providing a tapped signal and means for monitoring the tapped signal.

7. An optical communications system as defined in claim 6, wherein the means for interrupting transmission comprises a processor and circuitry for determining when a magnitude of a tapped signal being above or a predetermined threshold.

8. An optical communications system as defined in claim 7, wherein the predetermined threshold is determined through calibration of the system.

9. An optical communications system as defined in claim 7, wherein the predetermined threshold is determined in dependence upon crosstalk measurements for the system.

10. An optical communications system as defined in claim 1, wherein the means separate from the first and second transmission means and first and second receiving means for monitoring a characteristic of at least one of the transmission and receiving paths includes a suitably programmed processor, said processor being programmed to signal said means exclusive of said first and second transmission means coupled to at least one of the first and second transmission paths for interrupting transmission along at least one of said paths to perform testing of the system.

11. An optical communications system comprising:
   primary and secondary communications modules, the secondary communications module being a standby module, communications being switchable between the primary and secondary modules and vice versa in dependence upon a predetermined event, said primary and secondary modules each including:
   a bi-directional communications path having first and second terminus ends, said first and second terminus ends being coupled to first transmission and receiving paths and second transmission and receiving paths respectively;
   first transmission means for transmitting first optical signals from the first transmission path via the first terminus end to the second receiving path via the second terminus end;
   second transmission means for transmitting second optical signals from the second transmission path via the second terminus end to the first receiving path via the first terminus end;
   first receiving means at the first receiving path for receiving optical signals transmitted from the second transmission means;
   second receiving means at the second receiving path for receiving optical signals transmitted from the first transmission means; and
   means for monitoring a characteristic of at least one of the transmission and receiving paths; and
   means coupled to at least one of the first and second transmission paths for interrupting transmission along at least one of said paths, in dependence upon the monitored characteristic.

12. An optical communications system as defined in claim 11 further comprising means for switching between said primary and secondary modules in dependence upon the monitored characteristic.

13. An optical communications module comprising:
   a bi-directional port for connection to a bi-directional communications path;
   a transmission and a receiving path coupled to the bi-directional port, the transmission path having an end for connection to an optical transmitter, and the receiving path having an end for connection to an optical receiver;
   means coupled to the transmission path between the end of the transmission path and bi-directional port for selectably, substantially interrupting an optical signal from being transmitted along the transmission path to the bi-directional port; and,
   means coupled to one of the transmission and receiving paths for monitoring an optical signal level thereon, and for providing control for selectably interrupting the optical signal.

14. An optical communications module as defined in claim 13, further comprising means associated with the means coupled to one of the transmission and receiving paths for effecting the resuming of transmission of the optical signal after it has been interrupted, said associated means being operative in dependence upon predetermined operating conditions being satisfied.

15. An optical communications module as defined in claim 13, wherein the means coupled to one of the transmission and receiving paths for monitoring an optical signal level thereon, and for providing control for selectably interrupting the optical signal includes a suitably programmed processor.

16. An optical communications system as defined in claim 15, wherein the communications module is programmed to perform coordinated testing of a system having at least two communications modules, said testing including establishing that optical signals are of a significantly greater magnitude than crosstalk signals.

17. An optical communications system having primary and secondary modules, each module including a bi-directional communications path having first and second terminus ends, said first and second terminus ends being coupled to first transmission and receiving paths and second transmission and receiving paths respectively;
   first transmission means for transmitting first optical signals from the first transmission path via the first terminus end to the second receiving path via the second terminus end;
   second transmission means for transmitting second optical signals from the second transmission path via the second terminus end to the first receiving path via the first terminus end;
   first receiving means at the first receiving path for receiving optical signals transmitted from the second transmission means;
   second receiving means at the second receiving path for receiving optical signals transmitted from the first transmission means; and
   means exclusive of the first and second transmission means coupled to at least one of the first and second transmission paths for interrupting transmission along at least one of said paths, in dependence upon a received stimulus.

18. A method of verifying an optical communications system including a bi-directional communications path having first and second terminus ends, said first and second terminus ends being coupled to first transmission and receiving paths and second transmission and receiving paths respectively;
   first transmission means for transmitting first optical signals from the first transmission path via the first terminus end to the second receiving path via the second terminus end;
   second transmission means for transmitting second optical signals from the second transmission path via the second terminus end to the first receiving path via the first terminus end;
   first receiving means at the first receiving path for receiving optical signals transmitted from the second transmission means;
   second receiving means at the second receiving path for receiving optical signals transmitted from the first transmission means;
   said method comprising the steps of:
      disabling transmission received from one of the first and second transmission means along one of the first and second transmission paths;
      monitoring a received signal at a receiving means located in the same terminus; and,
      verifying the transmission means/receiving means pair in dependence upon the monitored received signal.

19. A method as defined in claim 18, comprising the steps of performing coordinated testing including the steps of:
   disabling transmission in the other of the first and second transmission means along the other of the first and second transmission paths;
   monitoring a received signal at a receiving means located in the same terminus; and,
   verifying the transmission means/receiving means pair in dependence upon the monitored received signal.

20. A method as defined in claim 18 wherein coordinated testing is performed to establish that detected optical signals are of a significantly greater magnitude than crosstalk signals.

* * * * *